US008369983B2

(12) United States Patent
Sato et al.

(10) Patent No.: US 8,369,983 B2
(45) Date of Patent: Feb. 5, 2013

(54) FITTING APPARATUS (75) Inventors: Takashi Sato, Yamanashi (JP); Nobuaki Yamaoka, Yamanashi (JP)

(73) Assignee: Fanuc Ltd., Yamanashi (JP)

( * ) Notice: Subject to any disclaimer, the term of this patent is extended or adjusted under 35 U.S.C. 154(b) by 1272 days.

(21) Appl. No.: 12/138,995

(22) Filed: Jun. 13, 2008

(65) Prior Publication Data

US 2008/0312769 A1 Dec. 18, 2008

(30) Foreign Application Priority Data

Jun. 14, 2007 (JP) .................................. 2007-157333

(51) Int. Cl.
*G06F 7/00* (2006.01)

(52) U.S. Cl. ........ 700/220; 700/213; 700/219; 700/245; 700/254

(58) Field of Classification Search ............ 700/95, 700/96–114, 117, 118, 178, 213, 219–222, 700/245–264

See application file for complete search history.

(56) References Cited

U.S. PATENT DOCUMENTS

| 5,441,437 | A | 8/1995 | Hulstedt |
| 6,140,788 | A | 10/2000 | Watanabe et al. |
| 6,141,863 | A | 11/2000 | Hara et al. |
| 6,553,652 | B2 | 4/2003 | Sakakibara et al. |
| 6,701,196 | B2 | 3/2004 | Itoko et al. |
| 7,181,314 | B2 | 2/2007 | Zhang et al. |
| 2005/0113971 | A1 | 5/2005 | Zhang et al. |

FOREIGN PATENT DOCUMENTS

| EP | 0901054 A1 | 3/1999 |
| EP | 1052072 A1 | 11/2000 |
| EP | 1112805 A2 | 7/2001 |
| JP | 04-43744 B4 | 7/1992 |
| JP | 05-038637 A | 2/1993 |
| JP | 06-126665 A | 5/1994 |
| JP | 06-83976 B4 | 10/1994 |
| JP | 07-001260 A | 1/1995 |
| JP | 2604929 B2 | 1/1997 |

OTHER PUBLICATIONS

Erik G. Vaaler et al., "A Machine Learning Algorithm for Automated Assembly," IEEE, 1991, pp. 2231-2237.
EP Search Report for EP08010707.1 dated Nov. 7, 2008.
Notice of Reasons for Rejection for JP2007-157333 mailed Nov. 11, 2008.

*Primary Examiner* — Khoi Tran
*Assistant Examiner* — Bhavesh V Amin
(74) *Attorney, Agent, or Firm* — Lowe Hauptman Ham & Berner LLP (57) ABSTRACT

A fitting apparatus includes a robot arm having, at the forward end thereof, a gripper for holding a workpiece, a force detector for detecting a force and moment received by the workpiece held by the gripper, and a controller for controlling an operation of the robot arm. The controller includes a motion command generating unit for generating an operation command to fit two workpieces to each other, and an operation command correcting unit for correcting the operation command so as to correct the position of the gripper in a direction perpendicular to the fitting direction and the orientation of the gripper around an axis perpendicular to the fitting direction until the detected force and moment become less than or equal to a threshold value, based on either maximum values of the force and moment detected by the force detector while the two workpieces are in contact with each other or the force and moment detected by the force detector when the two workpieces first come into contact with each other.

6 Claims, 7 Drawing Sheets

FITTING APPARATUS

RELATED APPLICATIONS

The present application is based on, and claims priority from, Japan Application Number 2007-157333, filed Jun. 14, 2007, the disclosure of which is hereby incorporated by reference herein in its entirety.

BACKGROUND OF THE INVENTION

1. Field of the Invention

The present invention relates to a fitting apparatus for fitting two workpieces to each other using a robot while performing compliance control or force control.

2. Description of the Related Art

In carrying out assembly using a robot, it is required to position a workpiece in place on a table while at the same time moving another workpiece accurately to the place with the robot. However, between the workpiece held by the robot and the workpiece fixed to the table, there exists a position error and an orientation error, which sometimes adversely affects assembly, or especially, the fitting of the two workpieces by the robot. In order to solve this problem, a fitting apparatus for fitting two workpieces to each other generally uses a RCC (remote center compliance) mechanism in which a spring or a damper is interposed between the robot arm and the robot gripper to thereby provide a mechanically elastic motion of the gripper mounted at the forward end of the robot arm, so that one workpiece held in the gripper can be fitted smoothly with the other workpiece by automatically changing the position and the orientation of the one workpiece held in the gripper even in the presence of some position error or orientation error. Further, as described in Japanese Examined Patent Publication No. 4-43744, Japanese Examined Patent Publication No. 6-83976, Japanese Unexamined Patent Publication No. 5-38637 and Japanese Patent No. 2604929, a compliance control method or force control method can be used in which the robot is operated as if there exists a spring or a damper between the robot arm and the robot gripper by controlling the operation of the robot arm to thereby obtain the same effect as the RCC mechanism.

In the conventional compliance control or force control, one of the two workpieces to be fitted to each other is held by the gripper of the robot arm and pressed against the other workpiece to thereby carry out the fitting operation, while the force and moment exerting on the workpiece held by the gripper are detected and the operation of the robot arm is controlled and corrected so as to bring the detected force and moment to a target value. In correcting the operation of the robot arm for each control period, the difference between the detected force and the target force and the difference between the detected moment and the target moment are multiplied by a parameter called a force control gain to thereby calculate a command velocity and a command angular velocity for the robot arm. Based on the command velocity and the command angular velocity thus calculated, the workpiece held by the gripper is translated and rotated. Therefore, the force control gain exhibits the force control performance and a larger value of the force control gain can achieve a quicker correction of the position and orientation of the workpiece held by the gripper.

However, as the force control gain is increased, the vibration of the robot arm and the vibration due to the contact between the workpieces are liable to be amplified and the operation of the robot arm is easily oscillated. Therefore, in the conventional compliance control or force control, the force control gain can be increased only to a value determined by the oscillation limit, and in the system having an initial error in the position and orientation of the workpieces and the robot arm, the error correction requires a vast amount of time.

SUMMARY OF THE INVENTION

Accordingly, it is an object of the present invention to provide a fitting apparatus using the compliance control or force control in which workpieces can be fitted to each other more quickly and more stably than in the prior art.

In order to achieve the object described above, according to the present invention, a fitting apparatus is provided which includes a robot arm having, at the forward end thereof, a gripper for holding a workpiece, a force detector for detecting a force and moment received by the workpiece held by the gripper, and a controller for controlling an operation of the robot arm, the gripper holding one of two workpieces to be fitted to each other and moving the workpiece in a fitting direction to be fitted to the other of the two workpieces while compliance control or force control is performed so as to correct a position and orientation of the workpiece held by the gripper based on an output of the force detector, wherein the controller includes an operation command generating unit for generating an operation command to fit the two workpieces to each other, and an operation command correcting unit for correcting the operation command generated by the operation command generating unit so as to correct the position of the gripper in a direction perpendicular to the fitting direction and the orientation of the gripper around an axis perpendicular to the fitting direction until the force and moment detected by the force detector become less than or equal to a predetermined threshold value, based on either maximum value of the force and moment detected by the force detector while the two workpieces are in contact with each other or the force and moment detected by the force detector when the two workpieces first come into contact with each other, the controller controlling the operation of the robot arm to fit the two workpieces to each other in accordance with the corrected operation command.

In the fitting apparatus according to the present invention, the operation command for the robot arm is corrected, in every control cycle of the controller, based on either maximum value of the force and moment detected by the force detector while the two workpieces are in contact with each other or the force and moment detected by the force detector when the two workpieces first come into contact with each other, and the position of the gripper and workpiece in the direction perpendicular to the fitting direction and the orientation of the gripper and workpiece around the axis perpendicular to the fitting direction are corrected until the force and moment detected by the force detector are reduced to or less than the predetermined threshold value. The force and moment of the workpiece held by the gripper are detected in every control cycle, and the force and moment thus detected are used only for monitoring whether or not they are reduced to or less than the predetermined threshold value. Therefore, even if the force detection means is accompanied by noises due to the vibration of the robot arm or workpiece, the correcting operation is not substantially affected, and the force control gain can be set to a larger value than that in the prior art.

In the fitting apparatus described above, the operation command correcting unit preferably corrects the operation command so as to reduce the force and moment detected by the force detector. For example, the force detector detects the forces exerting in the directions along two axes perpendicular to the fitting direction and perpendicular to each other, and the operation command correcting unit corrects the operation command based on the forces in the directions along the two axes detected by the force detector to thereby correct the position of the gripper in the directions perpendicular to the fitting direction. The force detector detects the moments around the two axes perpendicular to the fitting direction and perpendicular to each other, and the operation command correcting unit corrects the operation command based on the moments around the two axes detected by the force detector to thereby correct the orientation of the gripper around the axes perpendicular to the fitting direction.

The operation command correcting unit preferably corrects the operation command until the force and moment detected by the force detector are reduced to zero.

The force detector can be a force sensor.

The force detector may determine the force and moment received by the workpiece, based on a current value of an actuator for driving the robot arm.

In the preset application, the term "force control gain" is a constant defined by the following equation.

Force control gain for force=command velocity (m/s)/
(detected force−target force)(Kgf)

Force control gain for moment=command angular
velocity (rad/s)/(detected moment−target
moment)(Kgfm)

According to the present invention, even if the force detection means is accompanied by noises due to the vibration of the robot arm or workpiece, the correcting operation is not affected, and a force control gain can be set to a larger value than that in the prior art, thereby making it possible to correct an initial error, if any in the workpieces or the robot arm, quicker than in the prior art. As a result, quick, stable fitting operation can be carried out.

BRIEF DESCRIPTION OF THE DRAWINGS

The above and other objects, features and advantages of the present invention will be described in more detail below based on preferred embodiments of the present invention with reference to the accompanying drawings, in which.

DETAILED DESCRIPTION

The preferred embodiments of the present invention will be described below with reference to the accompanying drawings.

Figure 1:
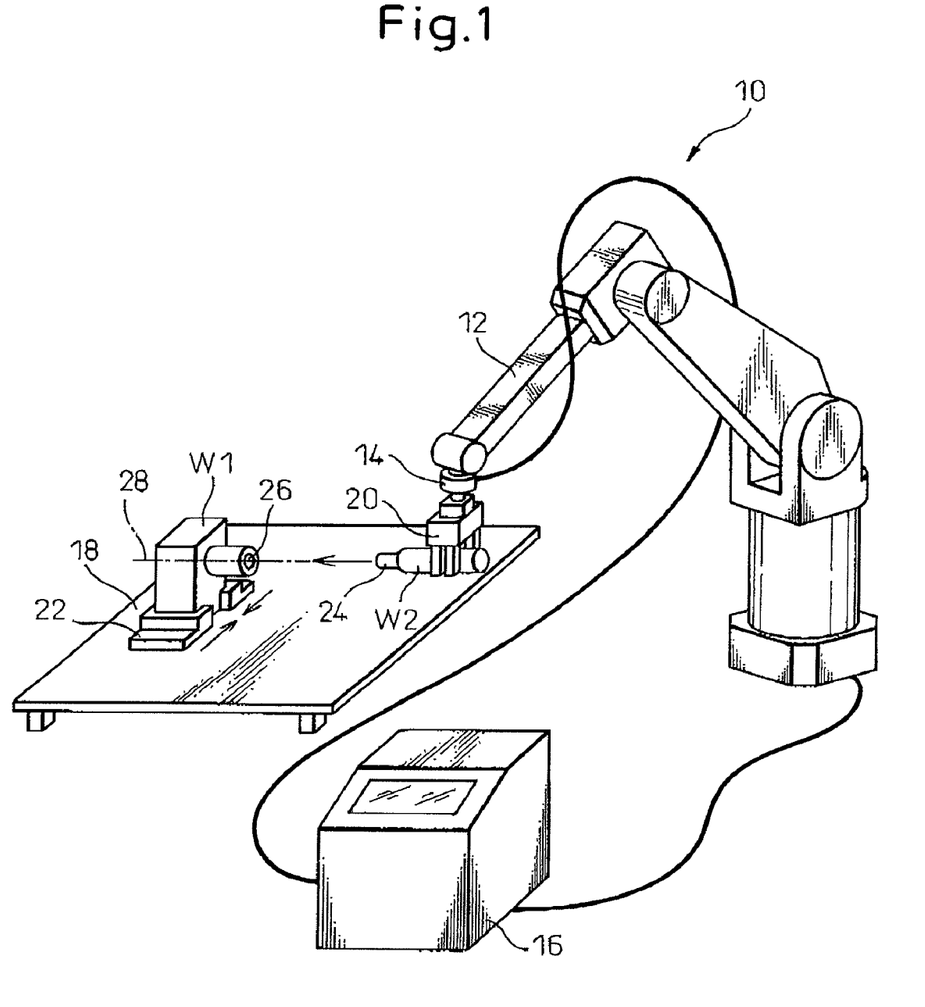
FIG. 1 is a perspective view showing a general configuration of a fitting apparatus according to the present invention.

First, a general configuration of a fitting apparatus 10 according to the present invention will be explained with reference to FIG. 1.

The fitting apparatus 10 includes a robot arm 12 adapted to be able to move around a plurality of axes, a force detector 14 for detecting a force and a moment, a controller 16 for controlling an operation of robot arm 12, and a table 18 for mounting a workpiece W1 thereon. A gripper 20 adapted to be able to hold and release a workpiece W2 is provided at the forward end of robot arm 12. A clamp unit 22 for fixing workpiece W1 is provided on table 18, so that workpiece W1 to be fitted to workpiece W2 held by gripper 20 can be fixed removably to table 18.

Force detector 14 is mounted on the wrist of robot arm 12 so that force F and moment M received by workpiece W2 held by gripper 20 can be detected. For example, force detector 14 can be a 6-axis force sensor, which is mounted between the forward end of robot arm 12 and gripper 20 and adapted to be able to detect forces in directions along three orthogonal axes and moments around three orthogonal axes. However, force detector 14 is not limited to the 6-axis force sensor, but may be any device for estimating the force and the moment received by workpiece W2 held by gripper 20, based on a current value of an actuator (not shown) such as a motor for driving robot arm 12.

Workpieces W1, W2 to be fitted to each other may be constituted, for example, by a workpiece W2 having a cylindrical protrusion 24 and a workpiece W1 formed with a cylindrical fitting hole 26 mating with cylindrical protrusion 24. In fitting apparatus 10 shown in FIG. 1, workpiece W2 having protrusion 24 is held by gripper 20 and moved in the fitting direction parallel to a center axis 28 of fitting hole 26 with protrusion 24 aligned with center axis 28 of fitting hole 26 of workpiece W1 fixed to table 18, so that protrusion 24 of workpiece 2 is inserted into fitting hole 26 of workpiece W1 to thereby fit two workpieces W1, W2 to each other.

Figure 2:
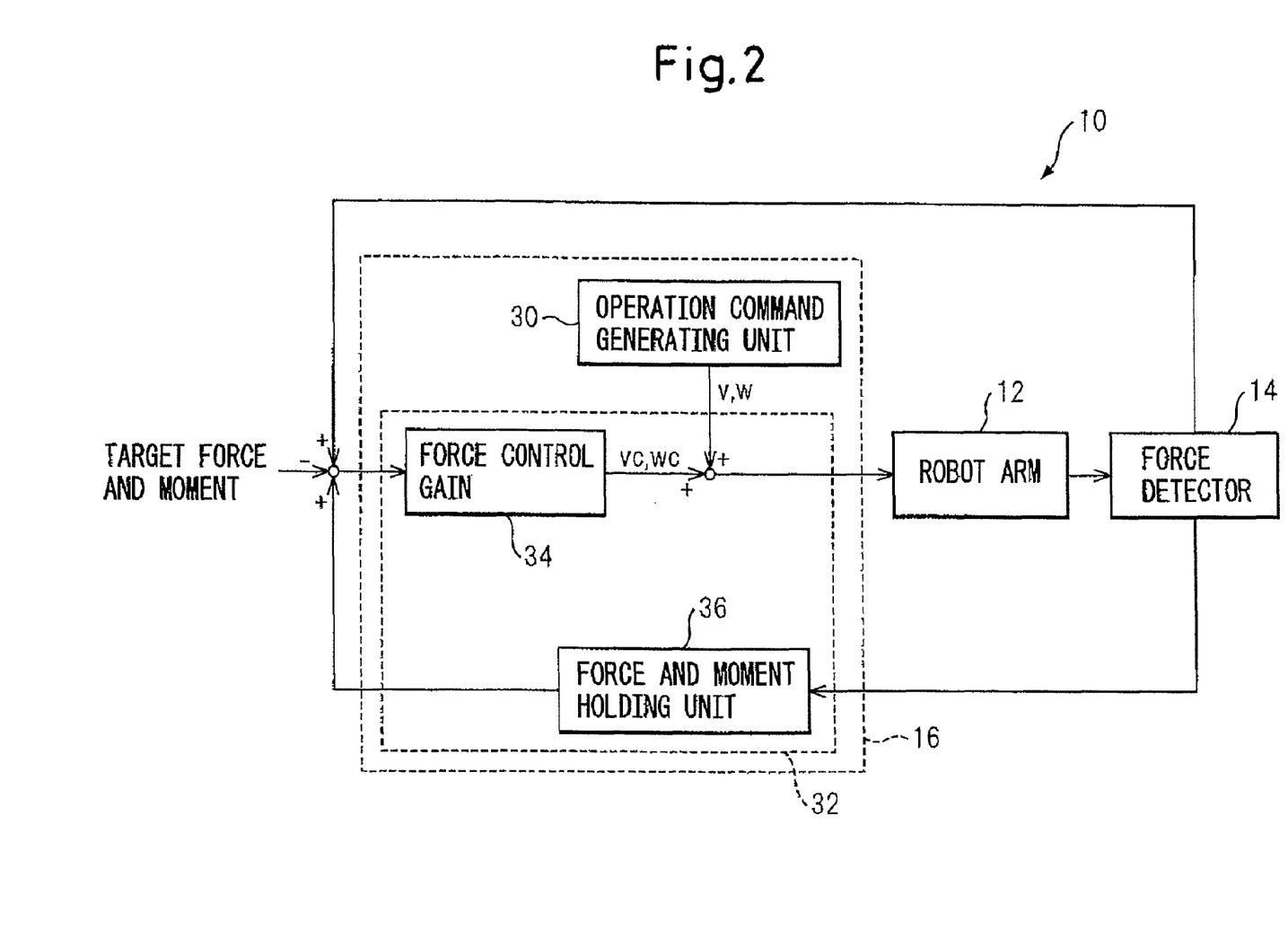
FIG. 2 is a function block diagram of the fitting apparatus according to the present invention.

FIG. 2 is a function block diagram of fitting apparatus 10 according to the present invention, showing the detail of control unit 16 used in fitting apparatus 10.

Controller 16, as shown in FIG. 2, includes an operation command generating unit 30 for generating an operation command for robot arm 12 and gripper 20, and an operation command correcting unit 32 for correcting, under predetermined conditions, the operation command generated by operation command generating unit 30. Operation command generating unit 30, in accordance with a program input in advance or the like, generates operation commands, specifically a velocity command and an angular velocity command, for robot arm 12 and gripper 20 thereof so as to make gripper 20 hold one workpiece W2 included in two workpieces W1, W2 to be fitted to each other at a predetermined place and fit it to the other workpiece W1 fixed at a predetermined place on table 18. Operation command correcting unit 32 is configured of a force control gain unit 34 and a force and moment holding unit 36.

Force and moment holding unit 36 is implemented by a storage unit such as a RAM and adapted to store or hold maximum values F', M' of force F and moment M detected by force detector 14 while workpiece W2 held by gripper 20 and workpiece W1 fixed to table 18 are in contact with each other, and values F0, M0 of force F and moment M detected by force detector 14 when workpiece W2 held by gripper 20 and workpiece W1 fixed to table 18 first come into contact with each other. Force control gain unit 34, upon input of the difference between forces F', F0 and moments M', M0 held in force and moment holding unit 36 and a target force Fd and a target moment Md to be detected by force detector 14 when workpieces W1, W2 are fitted to each other, multiplies the input by a force control gain G to thereby output a velocity command correction amount υc and an angular velocity command correction amount ωc for causing robot arm 12 and gripper 20 to perform the motion required to make force F and moment M detected by force detector 14 approach target force Fd and target moment Md, respectively.

Operation command correcting unit 32 corrects velocity command υ and angular velocity command ω by adding velocity command correction amount υc and angular velocity command correction amount ωc output from force control gain unit 34 to velocity command υ and angular velocity command ω generated by operation command generating unit 30, respectively, and causes robot arm 12 and gripper 20 thereof to move based on corrected velocity command υ' and corrected angular velocity command ω'. The correction of the operation commands by operation command correcting unit 32 is continued until force F and moment M detected by force detector 14 are reduced to less than or equal to predetermined threshold values TF, TM, respectively.

Figure 3:
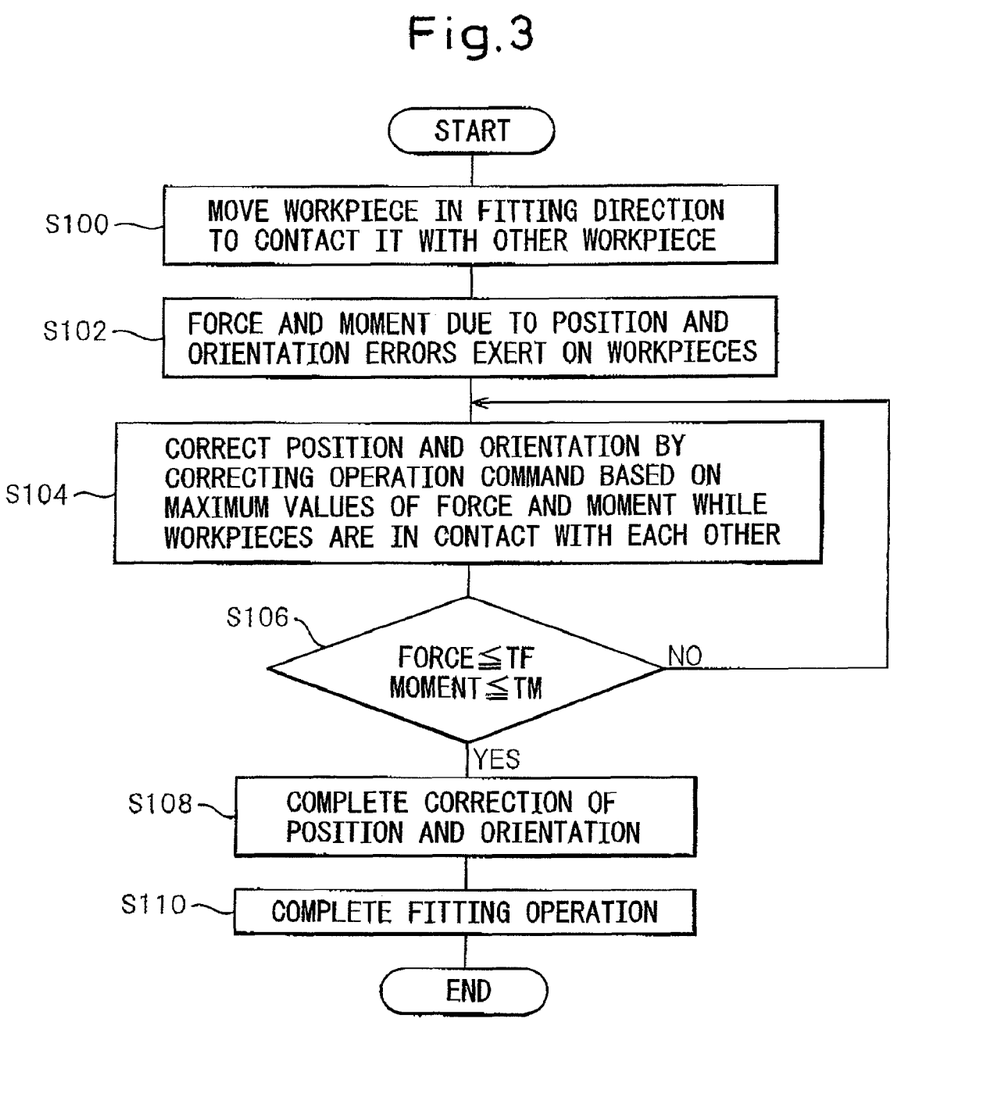
FIG. 3 is a flowchart showing steps of the fitting operation by the fitting apparatus shown in FIGS. 1 and 2.

Next, the operation of fitting apparatus 10 shown in FIGS. 1 and 2 will be described with reference to FIGS. 3 to 5. In the following description, a Z-axis represents a direction of center axis 28 of fitting hole 26 of workpiece W1 fixed to table 18, and X- and Y-axes represent directions perpendicular to each other in a plane perpendicular to the Z-axis.

First, one workpiece W1 included in workpiece pair W1, W2 to be fitted to each other is fixed at a predetermined place on table 18 by the operator or another robot. In accordance with the operation command generated by operation command generating unit 30 based on a predetermined program or the like, robot arm 12 holds, by gripper 20 thereof, mating workpiece W2 arranged at a predetermined place, and moves workpiece W2 to a place in opposed relation to workpiece W1 fixed to table 18 so as to align the axis of protrusion 24 of workpiece W2 held by gripper 20 with center axis 28 of fitting hole 26 of workpiece W1 fixed to table 18. Robot arm 12 further moves workpiece W2 in the fitting direction (i.e. Z-axis direction) parallel to center axis 28 of fitting hole 26 of workpiece W1 to contact it with workpiece W1 on table 18 (step S100). Please note that the operation commands include a velocity command $υ(υ_x, υ_y, υ_z)$ for translating gripper 20 along the directions of the X-, Y- and Z-axes and an angular velocity command $ω(ω_W, ω_P, ω_R)$ for rotating gripper 20 around the X-, Y- and Z-axes and that the components of velocity command υ and angular velocity command ω other than the fitting direction component of the velocity command become zero, i.e. $υ_x=0$, $υ_y=0$, $ω_W=0$, $ω_P=0$ and $ω_R=0$.

In the case where workpiece W1 and workpiece W2 are arranged such that center axis 28 of fitting hole 26 of workpiece W1 fixed to table 18 is accurately aligned with the axis of protrusion 24 of workpiece W2 held by gripper, 20, protrusion 24 of workpiece W2 will be smoothly inserted into fitting hole 26 of workpiece W1. Specifically, the components of force $F(F_X, F_Y, F_Z)$ and moment $M(M_X, M_Y, M_Z)$ exerting on workpiece W2 during the fitting operation other than the fitting direction component become zero (i.e. $F_X=0$, $F_Y=0$, $M_X=0$, $M_Y=0$, $M_Z=0$). Therefore, target $Fd(Fd_X, Fd_Y, Fd_Z)$ and target moment $Md(Md_X, Md_Y, Md_Z)$ to be exerted on workpiece W2 during the fitting operation are determined so that all the components of target force Fd ($Fd_X, Fd_Y, Fd_Z$) and target moment Md ($Md_X, Md_Y, Md_Z$) other than the fitting direction component become zero (i.e. $Fd_X=0$, $Fd_Y=0$, $Md_X=0$, $Md_Y=0$, $Md_Z=0$).

Figure 4A:
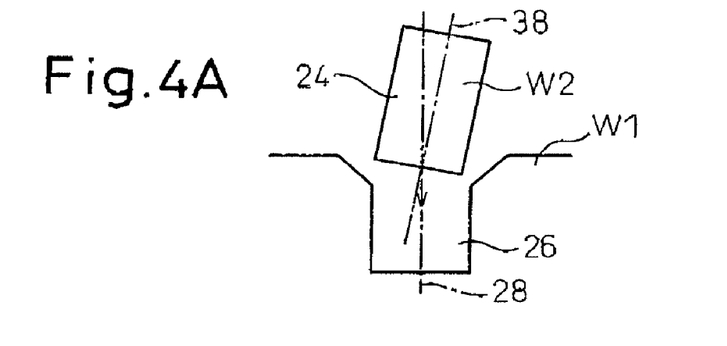
FIGS. 4A to 4D are diagrams showing the steps of the fitting operation by the fitting apparatus shown in FIGS. 1 and 2.
Figure 4B:
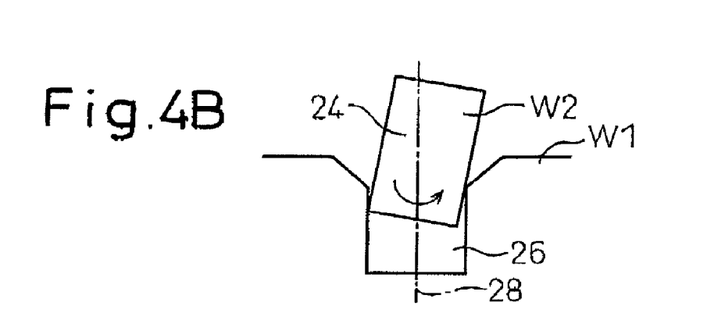

However, position and orientation errors occur when workpiece W1 is fixed to table 18 and workpiece W2 is held by gripper 20, and the fitting operation is often performed while center axis 28 of fitting hole 26 of workpiece W1 fixed to table 18 is not accurately aligned with the axis of protrusion 24 of workpiece W2 held by gripper 20. When workpiece W2 held by gripper 20 comes into contact with workpiece W1 fixed to table 18 in such a case, some force F and moment M exert on workpiece W2 held by gripper 20 (step S102). For example, in the case where, as shown in FIG. 4A, axis 38 of protrusion 24 of workpiece W2 held by gripper 20 is inclined with respect to center axis 28 of fitting hole 26 of workpiece W1 fixed to table 18, when two workpieces W1, W2 come into contact with each other, forces $F_X$ and $F_Y$ in the directions perpendicular to the fitting direction and moments $M_X$, $M_Y$ around the axes perpendicular to the fitting direction exert on workpiece W2 held by gripper 20, as shown in FIG. 4B. Once force detector 14 detects force F and moment M received by workpiece W2, controller 16 controls the operation of robot arm 12 and gripper 20 such that force F and moment M detected by force detector 14 approach target force Fd and target moment Md, respectively.

In fitting apparatus 10 according to the present invention, the maximum values of force $F(F_X, F_Y, F_Z)$ and moment $M(M_X, M_Y, M_Z)$ detected by force detector 14 while workpiece W1 fixed to table 18 and workpiece W2 held by gripper 20 are in contact with each other are stored or held in force and moment holding unit 36. In every control cycle, force and moment holding unit 36 compares the components of force $F(F_X, F_Y, F_Z)$ and moment $M(M_X, M_Y, M_Z)$ detected by force detector 14 with the corresponding components of force $F'(F'_X, F'_Y, F'_Z)$ and moment $M'(M'_X, M'_Y, M'_Z)$ stored or held in force and moment holding unit 36. When any component of force $F(F_X, F_Y, F_Z)$ and moment $M(M_X, M_Y, M_Z)$ detected by force detector 14 is larger than the corresponding component of force $F'(F'_X, F'_Y, F'_Z)$ and moment $M'(M'_X, M'_Y, M'_Z)$ stored or held at that time in force and moment holding unit 36, the stored or held value of the component of force $F'(F'_X, F'_Y, F'_Z)$ and moment $M'(M'_X, M'_Y, M'_Z)$ is updated to the value of the corresponding component of force $F(F_X, F_Y, F_Z)$ and moment $M(M_X, M_Y, M_Z)$ detected by force detector 14, and stored or held.

Regarding Z-axis velocity command $υ_Z$, like in the conventional compliance control or force control, operation command correcting unit 32 multiplies the difference between Z-axis force $F_Z$ detected by force detector 14 and Z-axis target force $Fd_Z$ by force control gain $G_Z$ to thereby calculate a velocity command correction value $υc_Z$, and adds calculated velocity command correction value $υc_Z$ to Z-axis velocity command $υ_Z$ generated by operation command generating unit 30 to thereby correct Z-axis velocity command $υ_Z$. Specifically, in accordance with following equation (1), a corrected Z-axis velocity command $υ'_Z$ is determined.

$$υ'_Z=(F_Z-Fd_Z)\times G_Z+υ_Z \tag{1}$$

On the other hand, protrusion 24 of workpiece W2 and fitting hole 26 of workpiece W1 are cylindrical and the rotation around Z-axis is meaningless. Therefore, angular velocity command $ω_R$ around Z-axis and corrected angular velocity $ω'_R$ around Z-axis are not required to be determined. However, in the case where protrusion 24 of workpiece W2 and fitting hole 26 of workpiece W1 are not cylindrical, like in the conventional compliance control or force control, corrected angular velocity $ω'_R$ around Z-axis is determined according to the following equation.

$$ω'_R=(M_Z-Md_Z)\times G_R+ω_R$$

where $G_R$ is the force control gain for the moment around Z-axis.

Regarding X-axis velocity command $\upsilon_X$, Y-axis velocity command $\upsilon_Y$, angular velocity command around X-axis $\omega_W$ and angular velocity command around Y-axis $\omega_P$, operation command correcting unit 32 multiplies the difference between maximum values F', M' of the force and moment stored or held in force and moment holding unit 36 and target force Fd and target moment Md by force control gain G to thereby calculate velocity command correction amounts $\upsilon c_X$, $\upsilon c_Y$ and angular velocity command correction amounts $\omega c_W$, $\omega c_P$, and adds calculated velocity command correction amounts $\upsilon c_X$, $\upsilon c_Y$ and angular velocity command correction amounts $\omega c_W$, $\omega c_P$ to X-axis velocity command $\upsilon_X$, Y-axis velocity command $\upsilon_Y$, angular velocity command around X-axis $\omega_W$ and angular velocity command around Y-axis $\omega_P$ generated by operation command generating unit 30, respectively, to thereby correct X-axis velocity command $\upsilon_X$, Y-axis velocity command $\upsilon_Y$, angular velocity command around X-axis $\omega_W$ and angular velocity command around X-axis $\omega_P$, respectively. Taking into consideration the fact that X-axis target force $Fd_X$, Y-axis target force $Fd_Y$, moment around X-axis $Md_X$ and moment around Y-axis $Md_Y$ are all zero, corrected X-axis velocity command $\upsilon'_X$, corrected Y-axis velocity command $\upsilon'_Y$, corrected angular velocity command around X-axis $\omega'_W$ and corrected angular velocity command around Y-axis $\omega'_P$ can be determined from following Equations (2) to (5).

$$\upsilon'_X = (F'_X - Fd_X) \times G_X + \upsilon_X = F'_X \times G_X \quad (2)$$

$$\upsilon'_Y = (F'_Y - Fd_Y) \times G_Y + \upsilon_Y = F'_Y \times G_Y \quad (3)$$

$$\omega'_W = (M'_X - Md_X) \times G_W + \omega_W = M'_X \times G_W \quad (4)$$

$$\omega'_P = (M'_Y - Md_Y) \times G_P + \omega_P = M'_Y \times G_P \quad (5)$$

where $G_X$, $G_Y$ represent the force control gain of the X-axis force and the force control gain of the Y-axis force, respectively, and $G_W$, $G_P$ represent the force control gain of the moment around X-axis and the force control gain of the moment around Y-axis, respectively.

The fitting operation is an operation of moving gripper 20 and workpiece W2 only in the fitting direction, i.e. along Z-axis, and in the fitting operation, X-axis velocity command $\upsilon_X$, Y-axis velocity command $\upsilon_Y$, angular velocity command around X-axis $\omega_W$ and angular velocity command around Y-axis $\omega_P$ are all zero. Therefore, operation command correction amounts $\upsilon c_X$, $\upsilon c_Y$, $\omega c_W$, $\omega c_P$ determined by operation command correcting unit 32 become corrected X-axis velocity command $\upsilon'_X$, corrected Y-axis velocity command $\upsilon'_Y$, corrected angular velocity command around X-axis $\omega'_W$ and corrected angular velocity command around Y-axis $\omega'_P$, respectively. Thus, operation command correcting unit 32 determines $\upsilon'_X$, $\upsilon'_Y$, $\omega'_W$, $\omega'_P$ as the X-axis velocity command, the Y-axis velocity command, the angular velocity commands around X-axis and the angular velocity command around Y-axis, respectively, by multiplying maximum values F', M' of the force and the moment stored or held in force and moment holding unit 36 by force control gain G.

Figure 4C:
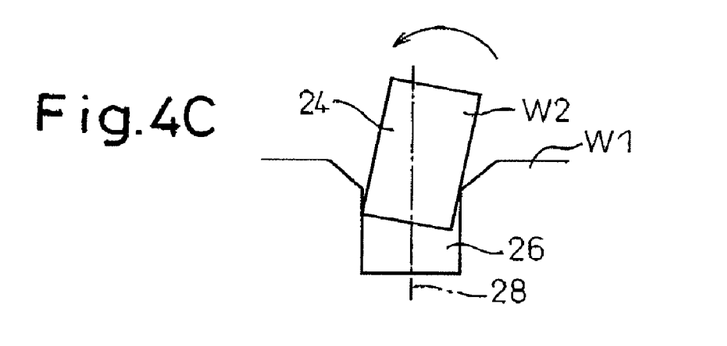

Controller 16, as shown in FIG. 4C, operates robot arm 12 and gripper 20, based on corrected X-axis velocity command $\upsilon'_X$, corrected Y-axis velocity command $\upsilon'_Y$, corrected Z-axis velocity command $\upsilon'_Z$, corrected angular velocity command around X-axis $\omega'_W$ and corrected angular velocity command around Y-axis $\omega'_P$ thus determined, and corrects the position and orientation of gripper 20 and workpiece W2 (step S104).

Next, X- and Y-axis forces $F_X$, $F_Y$ and moments $M_X$, $M_Y$ around X- and Y-axes detected by force detector 14 are compared with predetermined threshold values $TF_X$, $TF_Y$, $TM_X$, $TM_Y$, respectively, in every control cycle, and if any of the former values is larger than a predetermined corresponding threshold value, the process of step S104 is repeated in every control cycle and the correction of the position and orientation of gripper 20 and workpiece W2 is continued until all of $F_X$, $F_Y$, $M_X$, $M_Y$ satisfy following Equation (6) (step S106).

$$F_X \leq TF_X$$

$$F_Y \leq TF_Y$$

$$M_X \leq TM_X$$

$$M_Y \leq TM_Y \quad (6)$$

where threshold values $TF_X$, $TF_Y$ are ones associated with X-axis force $F_X$ and Y-axis force $F_Y$ detected, respectively, and threshold values $TM_X$, $TM_Y$ are ones associated with moment $M_X$ around X-axis and moment $M_Y$ around Y-axis, respectively.

Figure 4D:
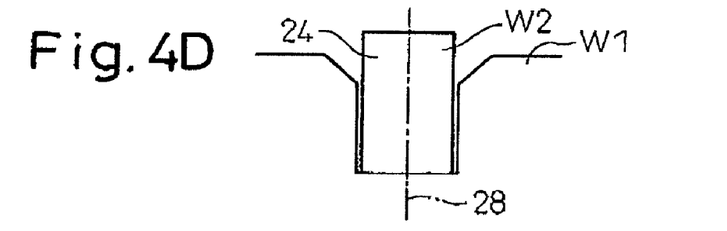

On the other hand, if all of forces $F_X$, $F_Y$ and moments $M_X$, $M_Y$ detected by force detector 14 become less than or equal to predetermined threshold values $TF_X$, $TF_Y$, $TM_X$, $TM_Y$, respectively, and Equation (6) comes to be satisfied, it is judged that the error correction of the position and orientation of gripper 20 and workpiece W2 has been completed (step S108). When the correction of the position and orientation of gripper 20 and workpiece W2 has been completed, axis 38 of protrusion 24 of workpiece W2 held by gripper 20 is aligned with center axis 28 of fitting hole 26 of workpiece W1 fixed to table 18. Therefore, by moving gripper 20 and workpiece W2 in the fitting direction while keeping this position and orientation, protrusion 24 of workpiece W2 held by gripper 20 can be smoothly inserted into fitting hole 26 of workpiece W1 fixed to table 18, as shown in FIG. 4D, thereby completing the fitting operation (step S110).

In the description of the above-mentioned operation of fitting apparatus 10 according to the present invention, maximum values $F'(F'_X, F'_Y, F'_Z)$ and $M'(M'_X, M'_Y, M'_Z)$ of force F and moment M detected by force detector 14 while workpiece W1 and workpiece W2 are in contact-with each other are stored or held in force and moment holding unit 36. However, alternatively, force and moment holding unit 36 may store or hold force $F0(F0_X, F0_Y, F0_Z)$ and moment $M0(M0_X, M0_Y, M0_Z)$ detected by force detector 14 when workpieces W1 and W2 first come into contact with each other. When two workpieces W1, W2 are not in contact with each other, force F and moment M are substantially zero. Therefore, by detecting that components of force $F(F_X, F_Y, F_Z)$ and moment $M(M_X, M_Y, M_Z)$ detected by force detector 14 has exceeded a predetermined value, the contact between the two workpieces W1, W2 can be detected.

Figure 5:
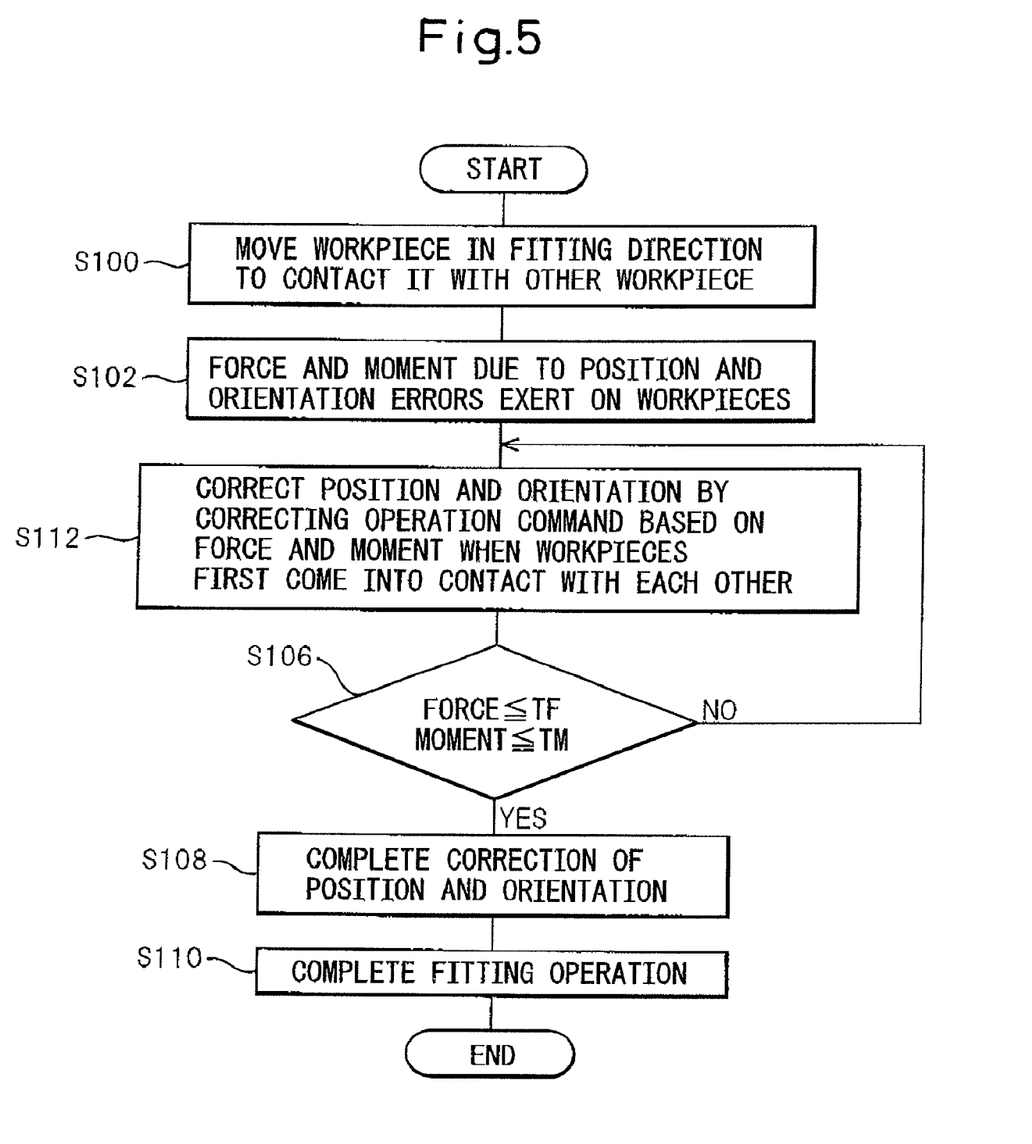
FIG. 5 is a flowchart showing steps of the fitting operation by the fitting apparatus shown in FIGS. 1 and 2 according to another embodiment.

FIG. 5 shows operation steps in the case where, as described above, force F0 and moment M0 detected by force detector 14 when workpieces W1, W2 first come into contact with each other are stored or held in force and moment holding unit 36. The operation steps shown in FIG. 5 are different from those shown in FIG. 3 in that step S104 of the operation steps shown in FIG. 3 is replaced by step S112, while the other steps remain the same.

Once workpieces W1, W2 come into contact with each other in step S100 and force F and moment M are exerted on workpiece W2 held by gripper 20, force F and moment M exerted on workpiece W2 are detected by force detector 14 (step S102). Force and moment holding unit 36 stores and then continues to hold force $F0(F0_X, F0_Y, F0_Z)$ and moment $M0(M0_X, M0_Y, M0_Z)$ detected by force detector 14 when workpieces W1 and W2 first come into contact with each other.

Operation command correcting unit 32, as in step S104, corrects Z-axis velocity command $\upsilon_Z$ generated by operation command generating unit 30, based on the difference between Z-axis force $F_Z$ detected by force detector 14 and Z-axis target force $Fd_Z$, and determines corrected Z-axis velocity command $\upsilon'_Z$ in accordance with Equation (1). Rotation around Z-axis is meaningless because protrusion 24 of workpiece W2 and fitting hole 26 of workpiece W1 are cylindrical. Therefore, angular velocity command $\omega_R$ around Z-axis and corrected angular velocity $\omega'_R$ around Z-axis are not required to be determined. However, when protrusion 24 of workpiece W2 and fitting hole 26 of workpiece W1 are not cylindrical, corrected angular velocity $\omega'_R$ around Z-axis may be determined in the same way as in the steps shown in FIG. 3.

On the other hand, regarding X-axis velocity command $\upsilon_X$, Y-axis velocity command $\upsilon_Y$, angular velocity command around X-axis $\omega_W$ and angular velocity command around Y-axis $\omega_P$, operation command correcting unit 32 multiplies the difference between force F0 and moment M0 stored or held in force and moment holding unit 36 and target force Fd and target moment Md by force control gain G to thereby calculate operation command correction amounts $\upsilon c_X$, $\upsilon c_Y$, $\omega c_W$, $\omega c_P$, and adds operation command correction amounts $\upsilon c_X$, $\upsilon c_Y$, $\omega c_W$, $\omega c_P$ thus determined by the calculation to X-axis velocity command $\upsilon_X$, Y-axis velocity command $\upsilon_Y$, angular velocity command around X-axis $\omega_W$ and angular velocity command around Y-axis $\omega_P$ generated by operation command generating unit 30, respectively, to thereby correct X-axis velocity command $\upsilon_X$, Y-axis velocity command $\upsilon_Y$, angular velocity command around X-axis $\omega_W$ and angular velocity command around Y-axis $\omega_P$. Taking into consideration the fact that X- and Y-axis target forces $Fd_X$, $Fd_Y$ and moments $Md_X$, $Md_Y$ around X- and Y-axes are all zero, corrected X-axis velocity command $\upsilon'_X$, corrected Y-axis velocity command $\upsilon'_Y$, corrected angular velocity command around X-axis $\omega'_W$ and corrected angular velocity command around Y-axis $\omega'_P$ can be determined from following Equations (2') to (5').

$$\upsilon'_X = (F0_X - Fd_X) \times G_X + \upsilon_X = F0_X \times G_X \quad (2')$$

$$\upsilon'_Y = (F0_Y - Fd_Y) \times G_Y + \upsilon_Y = F0_Y \times G_Y \quad (3')$$

$$\omega'_W = (M0_X - Md_X) \times G_W + \omega_W = M0_X \times G_W \quad (4')$$

$$\omega'_P = (M0_Y - Md_Y) \times G_P + \omega_P = M0_Y \times G_P \quad (5')$$

where $G_X$, $G_Y$ represent a force control gain of the X-axis force and a force control gain of the Y-axis force, respectively, and $G_W$, $G_P$ represent a force control gain of the moment around X-axis and a force control gain of the moment around Y-axis, respectively.

Further, since X-axis velocity command $\upsilon_X$, Y-axis velocity command $\upsilon_Y$, angular velocity command around X-axis $\omega_W$ and angular velocity command around Y-axis $\omega_P$ are all zero, operation command correction amounts $\upsilon c_X$, $\upsilon c_Y$, $\omega c_W$, $\omega c_P$ determined by operation command correcting unit 32 are corrected X-axis velocity command $\upsilon'_X$, corrected Y-axis velocity command $\upsilon'_Y$, corrected angular velocity command around X-axis $\omega'_W$ and corrected angular velocity command around Y-axis $\omega'_P$, respectively. Therefore, it can be said that operation command correcting unit 32 multiplies force F0 and moment M0 stored or held in force and moment holding unit 36 by force control gain G to thereby determine $\upsilon'_X$, $\upsilon'_Y$, $\omega'_W$, $\omega'_P$ as X- and Y-axis velocity commands and angular velocity commands around X- and Y-axes, respectively.

Controller 16 operates robot arm 12 and gripper 20 thereof based on corrected X-axis velocity command $\upsilon'_X$, corrected Y-axis velocity command $\upsilon'_Y$, corrected angular velocity command around X-axis $\omega'_W$ and corrected angular velocity command around Y-axis $\omega'_P$ thus determined to thereby correct the position and orientation of gripper 20 and workpiece W2 (step S112).

Next, in every control cycle, force F and moment M received by workpiece W2 are detected by force detector 14, and X- and Y-axis forces $F_X$, $F_Y$ and moments around X- and Y-axes $M_X$ and $M_Y$ thus detected are compared with predetermined threshold values $TF_X$, $TF_Y$, $TM_X$, $TM_Y$, respectively. If any of them is larger than the corresponding one of the predetermined threshold values, step S112 is repeated and the correction of the position and orientation of gripper 20 and workpiece W2 is continued until all of $F_X$, $F_Y$, $M_X$, $M_Y$ satisfy Equation (6), in every control cycle (step S106).

On the other hand, if all of forces $F_X$, $F_Y$ and moments $M_X$, $M_Y$ detected by force detector 14 become less than or equal to predetermined threshold values $TF_X$, $TF_Y$, $TM_X$, $TM_Y$, respectively, and Equation (6) comes to be satisfied, it is judged that the error correction of the position and orientation of gripper 20 and workpiece W2 has been completed (step S108). When the correction of the position and orientation of gripper 20 and workpiece W2 has been completed, axis 38 of protrusion 24 of workpiece W2 held by gripper 20 is aligned with center axis 28 of fitting hole 26 of workpiece W1 fixed to table 18. Therefore, by moving gripper 20 in the fitting direction while keeping this position and orientation, protrusion 24 of workpiece W2 held by gripper 20 can be smoothly inserted into fitting hole 26 of workpiece W1 fixed to table 18, thereby completing the fitting operation (step S110).

Next, effects of the present invention will be described taking the case as an example in which workpieces W1, W2 have an orientation error, with reference to FIGS. 6A, 6B, 7A and 7B.

FIGS. 6A, 6B, 7A and 7B illustrate graphs showing a temporal change in orientation change amount of gripper 20 and moment M detected by force detector 14 both in the case where the orientation error of workpiece W2 around X- and Y-axes with respect to workpiece W1 is corrected based on moment M detected by force detector 14 as in the conventional compliance control or force control and in the case where the orientation error of workpiece W2 around X- and Y-axes with respect to workpiece W1 is corrected based on maximum value M' of the moment detected by force detector 14 according to the present invention.

Figure 6A:
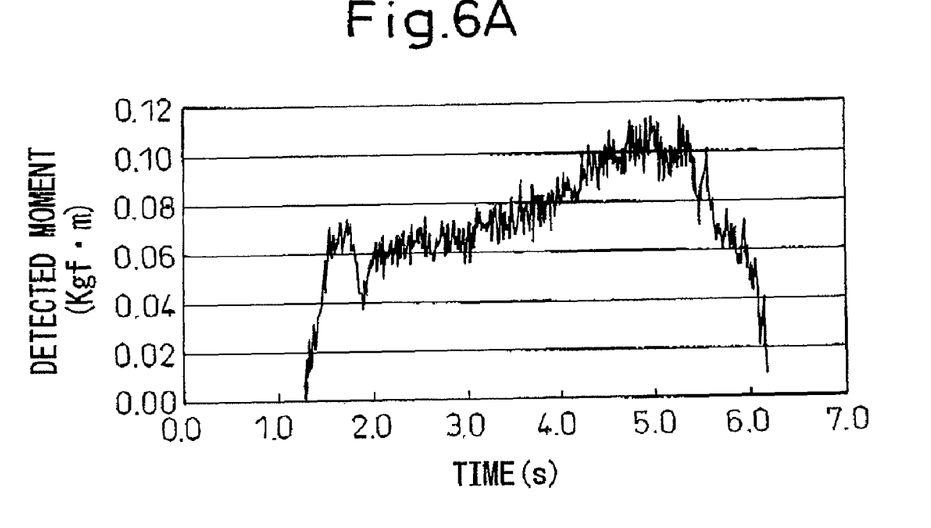
FIGS. 6A and 6B are graphs showing a temporal change of a moment received by a workpiece and a orientation of the workpiece under conventional compliance control or force control.
Figure 6B:
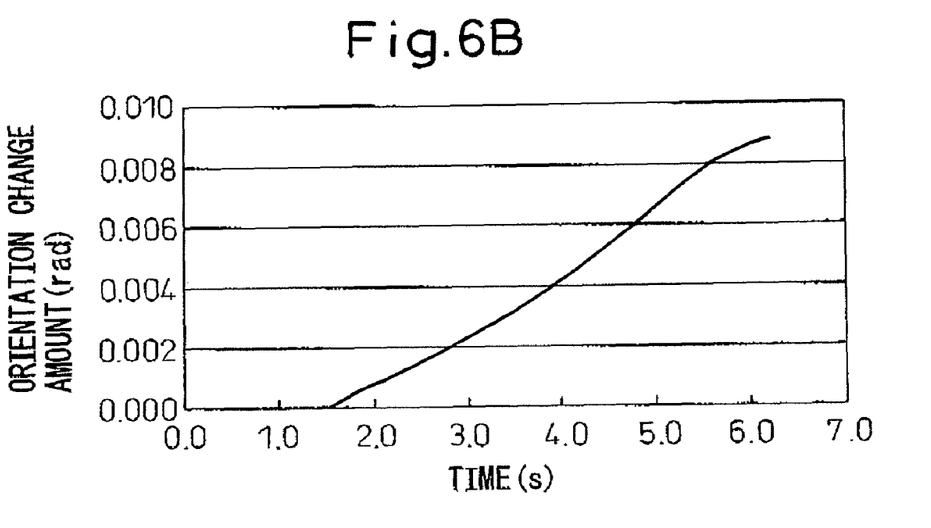

In FIGS. 6A and 6B showing the prior art, force control gain G is set to 0.03 (rad/Kgfms) in order to prevent oscillation due to vibration of workpiece W2. On the other hand, according to the present invention, an oscillation limit is higher than that in the prior art, and therefore, in FIGS. 7A and 7B, force control gain G is set to 0.09 (rad/Kgfms), i.e. three times as high as the force control gain in the case of FIGS. 6A and 6B. Also, in both cases shown in FIGS. 6A, 6B and 7A, 7B, the fitting operation is started from the state in which axis 38 of protrusion 24 of workpiece W2 held by gripper 20 and center axis 28 of fitting line 26 of workpiece W1 fixed to table 18 are misaligned with each other by 10 mrad, moment M due to the orientation error of workpiece W2 is generated after 1.3 seconds, and the orientation error is corrected after 1.5 seconds.

Figure 7A:
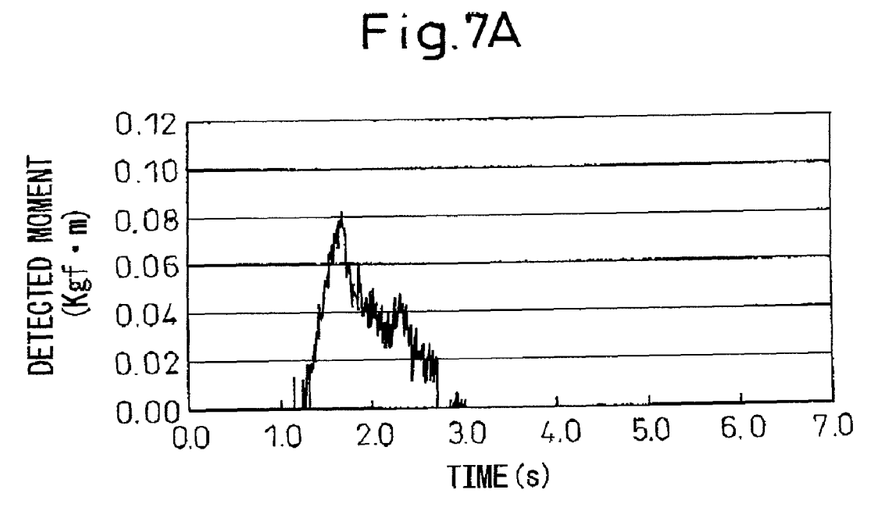
FIGS. 7A and 7B are graphs showing a temporal change of a moment received by a workpiece and an orientation of the workpiece under compliance control or force control employed by the fitting apparatus according to the present invention.
Figure 7B:
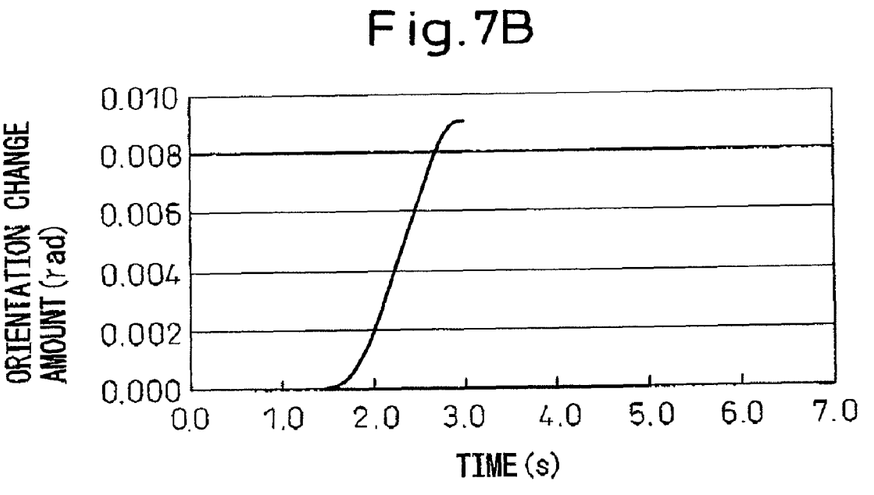

In FIGS. 6A, 6B showing the prior art, angular velocity command ω is determined from the magnitude of moment M detected at that time by force detector 14 in every control cycle, while in FIGS. 7A, 7B showing the present invention, the angular velocity command is determined from maximum value M' of the moment detected by force detector 14 during the contact of the workpieces with each other. Therefore, in FIGS. 7A, 7B, after 1.7 seconds when moment M becomes maximum, the angular velocity command is calculated from this maximum value M' and continues to be used until 2.8 seconds when moment M detected by force detector 14 becomes zero.

Thus, from FIGS. 7A and 7B showing the present invention, it can be understood that as the result of setting force control gain G at three times as large as the value for the prior art shown in FIGS. 6A and 6B, the correction of the orientation error of workpiece W2 is completed in about one third of the time required in the case shown in FIGS. 6A and 6B.

In fitting apparatus 10 according to the present invention, controller 16, in every control cycle, corrects the operation command for robot arm 12 based on maximum values F', M' of the force and the moment detected by force detector 14 while two workpieces W1, W2 are in contact with each other or force F0 and moment M0 detected by force detector 14 when two workpieces W1, W2 first come into contact with each other, so that the position of gripper 20 and workpiece W2 in the direction perpendicular to the fitting direction and the orientation of gripper 20 and workpiece W2 around the axis perpendicular to the fitting direction are corrected until force F and moment M detected by force detector 14 become less than or equal to predetermined threshold values TF, TM, respectively. Force F and moment M exerting on workpiece W2 held by gripper 20 are detected in every control cycle, and force F and moment M thus detected are used only for the purpose of monitoring whether force F and moment M have become less than or equal to the predetermined threshold values TF, TM, respectively. Specifically, data about force F and moment M detected by force detector 14 are not used directly for feedback control. Therefore, even if force detector 14 is accompanied by noises due to the vibration of robot arm 12 or workpiece W2, the operation of correcting the position error and the orientation error of workpiece W2 with respect to workpiece W1 is not substantially affected. Thus, force control gain G can be set to a larger value than that in the prior art. As a result, an initial error, if any, in workpieces W1, W2 or robot arm 12 can be corrected stably and more quickly than in the prior art.

Although the present invention has been described above based on the embodiments shown in the drawings, it should not be limited to those embodiments. For example, in the foregoing description, the position error is corrected based on force F exerting in the directions of the two axes (X and Y-axes in the above description) perpendicular to the fitting direction for each component, and the orientation error is corrected based on moment M exerting around the two axes (X- and Y-axes in the above description) perpendicular to the fitting direction for each component. However, the position error and the orientation error are not necessarily corrected for each component as described above. As an alternative, assuming that the resultant force of forces $F_X$, $F_Y$ received by workpiece W2 in the X- and Y-axis directions the instant workpieces W1 and W2 come into contact with each other is designated as FR and the direction of FR is designated as X', velocity command υ in X' direction may be determined from force control gain G. At the same time, assuming that the resultant moment of moments $M_X$, $M_Y$ around X- and Y-axes received by workpiece W2 the instant workpieces W1 and W2 come into contact with each other is designated as MR and the direction of the rotation axis of moment MR is designated as X", angular velocity command ω around rotation axis X" may be determined.

What is claimed is:

1. A fitting apparatus comprising a robot arm having, at the forward end thereof, a gripper for holding a workpiece, a force detector for detecting a force and moment received by said workpiece held by said gripper, and a controller for controlling an operation of said robot arm, said gripper holding one of two workpieces to be fitted to each other and moving said workpiece in a fitting direction to be fitted to the other of said two workpieces while compliance control is performed so as to correct a position and orientation of said workpiece held by said gripper based on an output of said force detector, wherein said controller includes an operation command generating unit for generating an operation command to fit said two workpieces to each other, and an operation command correcting unit for determining an operation command correcting amount to correct the position of said gripper in a direction perpendicular to the fitting direction and the orientation of said gripper around an axis perpendicular to the fitting direction and correcting the operation command generated by said operation command generating unit by said operation command correcting amount, until the force and moment detected by said force detector become less than or equal to a predetermined threshold value, based on either maximum values of the force and moment detected by said force detector and updated while said two workpieces are in contact with each other or the force and moment detected by said force detector when said two workpieces first come into contact with each other, said controller controlling the operation of said robot arm to fit said two workpieces with each other in accordance with the corrected operation command.

2. The fitting apparatus according to claim 1, wherein said operation command correcting unit corrects the operation command so as to reduce the force and moment detected by said force detector.

3. The fitting apparatus according to claim 2, wherein said force detector detects the force exerting in the directions along two axes perpendicular to the fitting direction and perpendicular to each other, and wherein said operation command correcting unit corrects the operation command based on the maximum values of the forces in the directions along the two axes detected by said force detector while said two workpieces are in contact with each other or the force in the directions along the two axes detected by said force detector when said two workpieces first come into contact with each other, to thereby correct the position of said gripper in the directions perpendicular to the fitting direction.

4. The fitting apparatus according to claim 2, wherein said force detector detects the moment around the two axes perpendicular to the fitting direction and perpendicular to each other, and wherein said operation command correcting unit corrects the operation command based on the maximum values of the moments around the two axes detected by said force detector while said two workpieces are in contact with each other or the moments around the two axes detected by said force detector when said two workpieces first come into contact with each other, to thereby correct the orientation of said gripper around the two axes perpendicular to the fitting direction.

5. The fitting apparatus according to claim 1, wherein said force detector comprises a force sensor.

6. The fitting apparatus according to claim 1, wherein said force detector determines the force and moment received by said workpiece, based on a current value of an actuator for driving said robot arm.

* * * * *